United States Patent
Goodman

(10) Patent No.: US 6,536,848 B1
(45) Date of Patent: Mar. 25, 2003

(54) NON-ROTATING DISPLAY WHEEL COVER

(75) Inventor: Lisa Marie Goodman, Sarasota, FL (US)

(73) Assignee: International Adcaps, Inc., Orlando, FL (US)

( * ) Notice: Subject to any disclaimer, the term of this patent is extended or adjusted under 35 U.S.C. 154(b) by 0 days.

(21) Appl. No.: 10/104,653

(22) Filed: Mar. 22, 2002

(51) Int. Cl.⁷ .............................. B60B 7/20; B60B 7/16
(52) U.S. Cl. ............................ 301/37.25; 301/37.21; 40/587
(58) Field of Search .................... 301/37.101, 37.21, 301/37.25, 108.1, 37.102, 37.109; 40/587; 70/225

(56) References Cited

U.S. PATENT DOCUMENTS

| | | |
|---|---|---|
| 710,195 A | 9/1902 | Jones |
| 2,014,058 A | 9/1935 | Tonai |
| 2,169,237 A | 8/1939 | Gasco |
| 2,548,070 A | 4/1951 | Ryan |
| 2,869,262 A | 1/1959 | Lucas |
| 2,995,402 A * | 8/1961 | Lyon ..................... 301/37.21 |
| 4,274,679 A * | 6/1981 | Brinson et al. .......... 301/37.21 |
| 4,280,293 A | 7/1981 | Kovalenko |
| 4,306,751 A * | 12/1981 | Wegner ................... 301/37.21 |
| 4,346,940 A * | 8/1982 | Tatar ..................... 301/37.101 |
| 4,678,239 A | 7/1987 | Matsushita |
| 5,190,345 A * | 3/1993 | Levy et al. .............. 301/37.25 |
| 5,190,354 A | 3/1993 | Levy |
| 5,490,342 A | 2/1996 | Rutterman |
| 5,588,715 A | 12/1996 | Harlen |
| 5,659,989 A | 8/1997 | Hsiao |
| 5,957,542 A | 9/1999 | Boothe |
| 6,120,104 A | 9/2000 | Okamoto |

* cited by examiner

Primary Examiner—Russell D. Stormer
(74) Attorney, Agent, or Firm—Charles J. Prescott

(57) ABSTRACT

A display wheel cover assembly connectable to a rotatable wheel of a vehicle. This invention includes an inner member rigidly connectable to the outside of the wheel and having a support-bearing member positioned coaxially with the wheel. A wheel cover having a coaxially extending support shaft is rotatably supported in the support-bearing member. An elongated cylindrical locking member is positioned within a longitudinal aperture formed through the support shaft. A cam member, connected to a distal end of the locking member, has a non-symmetric periphery such that, when properly rotatably orientated, are fully insertable into said support bearing member. In a second rotational orientation, the cam member prevents withdrawal of the support shaft from the support-bearing member. A counterweight attached to the wheel cover prevents rotation of the wheel cover. Interchangeable display indicia attach to the wheel cover.

3 Claims, 12 Drawing Sheets

NON-ROTATING DISPLAY WHEEL COVER

BACKGROUND OF THE INVENTION

1. Scope of Invention

This invention relates generally to automotive wheel covers, and more particularly to a commercial display wheel cover including a replaceable display disc which remains substantially stationary with respect to the vehicle while the vehicle is moving.

2. Prior Art

The central outer portion of a vehicle wheel, being fully viewable while the vehicle is in motion, provides an opportunity for the placement of readable graphics in this otherwise merely decorative or unornamental portion of the wheel of larger utility vehicles such as buses or trucks. The utilization of this otherwise merely unadorned space is contingent upon the readability of graphics and word messages being held relatively stationary with respect to the vehicle in motion.

A number of prior art patented inventions address this display and advertising opportunity.

In U.S. Pat. No. 5,659,989, Hsiao teaches a wheel cover which includes an outer disc member which is rotatably mounted to an inner base member so that the display indicia applied to the disc member will remain substantially rotation free under vehicle movement. This disclosure includes stabilizing structure to maintain alignment and restrict oscillation of the outer disc member bearing the viewable indicia thereon.

Boothe, in U.S. Pat. No. 5,957,542 discloses a theft-proof, non-rotational wheel cover with replaceable ornamental outer surface. This arrangement relies upon and is engageable within the central cavity of the automotive wheel.

Another advertising display device for a vehicle wheel is disclosed by Ryan in U.S. Pat. No. 2,548,070. In this arrangement, however, the device is adapted for attachment to a non-rotatable axle of the motor vehicle.

In U.S. Pat. No. 2,869,262, Lucas teaches another wheel-supported advertising sign arrangement which appears to attach in rotatable fashion to the outer hubcap of the wheel assembly.

In the disclosure of Kovalenko, in U.S. Pat. No. 4,280,293, a stationary display member is attachable to the vehicle hub and utilizes a flowable material such as mercury acting upon veins within a chamber of the device to substantially eliminate rotation of the bearing-mounted outer display member.

A non-rotating wheel cover assembly shown in U.S. Pat. No. 5,588,715 invented by Harlen teaches yet another wheel cover assembly which is attachable to the outer end of an axle by separate bracketry to support the bearing mounted display member. A thickened lower portion of the wheel cover provides sufficient counterbalance to inhibit or prevent rotation of the display cover while the vehicle is in motion.

Matsushita discloses a free wheel cap in U.S. Pat. No. 4,678,239 which teaches a non-rotating wheel cover having a counterbalanced disc-like body which is bearing connected to an inner multi-arm structure having spring-like clips connected at the outer periphery of the device which interengage with the wheel rim.

Another wheel cover was invented by Okamoto and disclosed in U.S. Pat. No. 6,120,104 teaching a flexible side feature connected to the center of the wheel in support of a display wheel cover. An air current guide is formed into the display cover which assists in stabilizing the display portion without substantial rotational movement as the vehicle is moving.

Other prior art devices which teach vehicle wheel display covers are as follows:

U.S. Pat. No. 710,195 to Jones
U.S. Pat. No. 2,014,058 to Tonai
U.S. Pat. No. 2,169,237 to Gasco
U.S. Pat. No. 4,781,419 to Boothe
U.S. Pat. No. 5,190,354 to Levy
U.S. Pat. No. 5,490,342 to Ruterman The present invention discloses a display wheel cover which is substantially non-rotating with respect to the vehicle when in motion and which, in a preferred embodiment, utilizes a unique inner member having an elongated hat-shaped section that facilitates attachment to the rim of the wheel by threadably adjustable rim-engaging members that align into the concave groove formed in the outer wheel rim. A unique cam-locking device both retains the outer display wheel cover in place and also prevents its theft removal as a separate security feature requiring a special tool for removal.

BRIEF SUMMARY OF THE INVENTION

This invention is directed to a display wheel cover assembly connectable to a rotatable wheel of a vehicle. This invention includes an inner member rigidly connectable to the outside of the wheel and having a support-bearing member positioned coaxially with the Wheel. A wheel cover having a coaxially extending support shaft is rotatably supported in the support-bearing member. An elongated cylindrical locking member is positioned within a longitudinal aperture formed through the support shaft. A cam member, connected to a distal end of the locking member, has a non-symmetric periphery such that, when properly rotatably orientated, are fully insertable into said support bearing member. In a second rotational orientation, the cam member prevents withdrawal of the support shaft from the support-bearing member. A counterweight attached to the wheel cover prevents rotation of the wheel cover. Interchangeable display indicia attach to the wheel cover.

It is therefore an object of this invention to provide a non-rotating wheel cover for a commercial utility vehicle or truck which will facilitate the application of decorative and readable commercial display indicia such as in advertising while the vehicle is moving.

It is yet another object of this invention to provide an advertising display cover for the wheel of a commercial vehicle which is easily interchangeable and which is rendered secure from inadvertent or theft removal by a unique locking arrangement.

In accordance with these and other objects which will become apparent hereinafter, the instant invention will now be described with reference to the accompanying drawings.

DETAILED DESCRIPTION OF THE INVENTION

Figure 1:
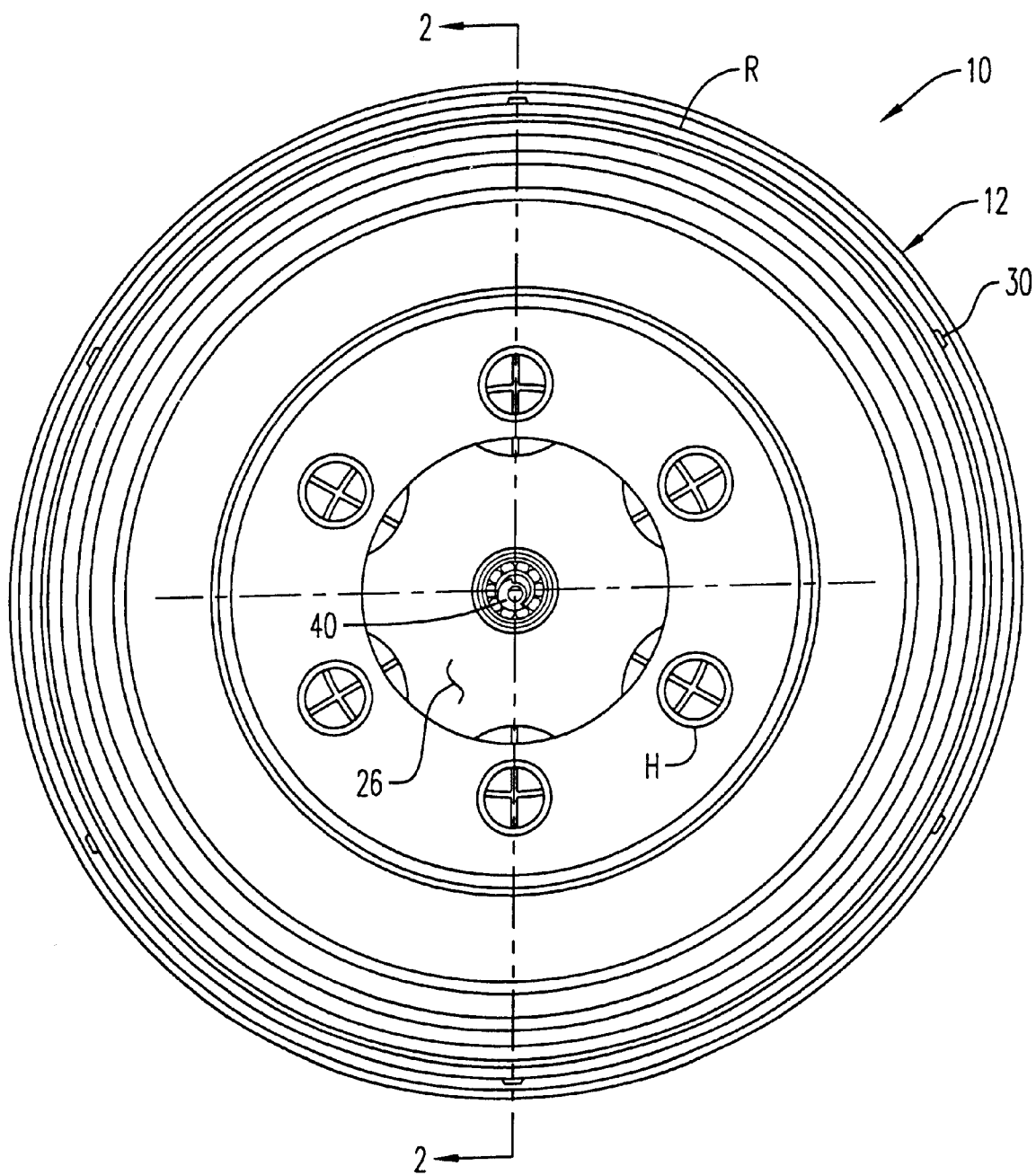
FIG. 1 is an inside elevation view of the invention attached to the wheel of the vehicle shown in FIG. 1A.
Figure 1A:
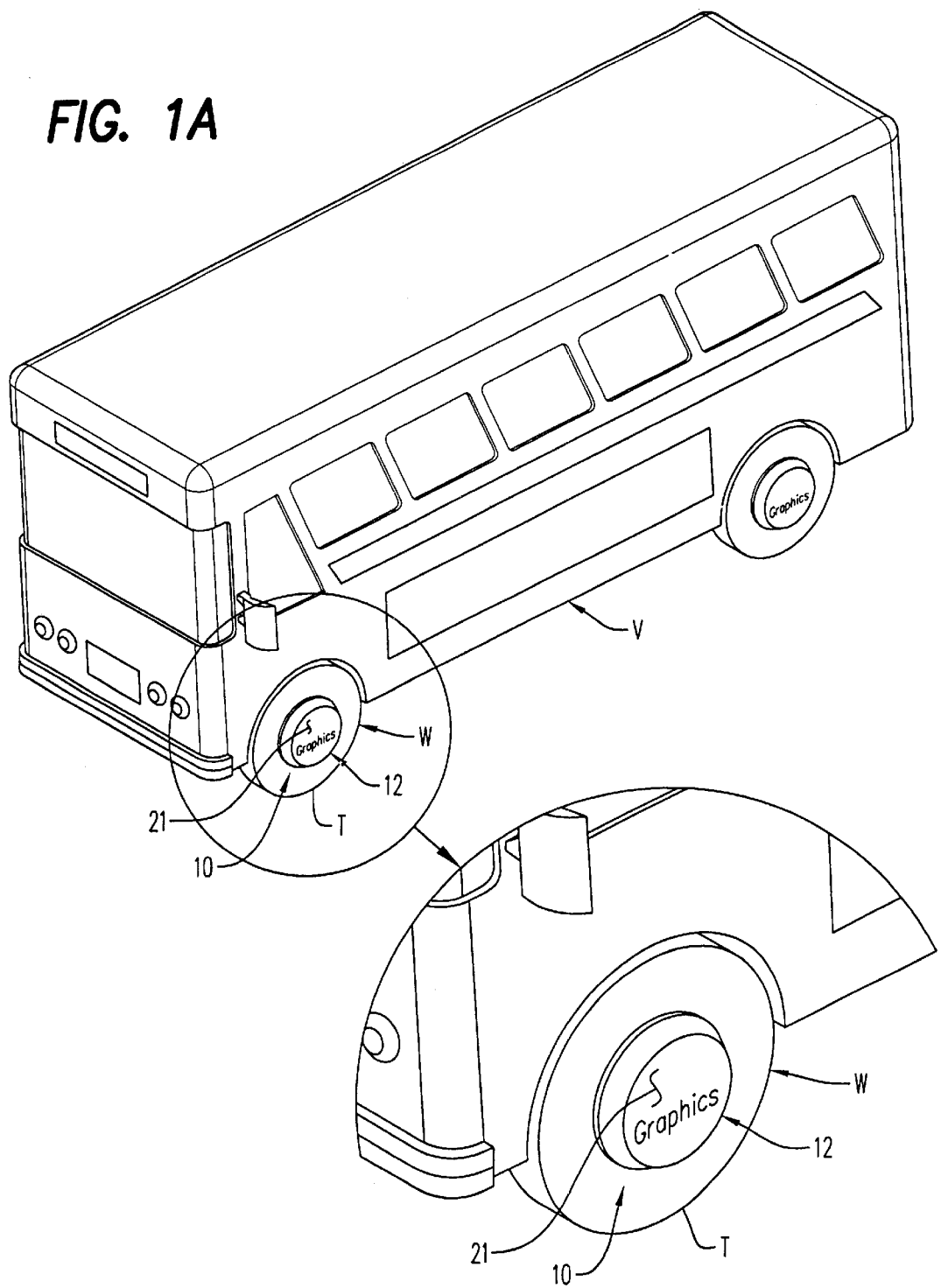
FIG. 1A is a perspective view of the invention and enlargement of an indicated portion thereof attached to the wheels of a commercial vehicle such as a bus utilized in mass transportation.
Figure 2:
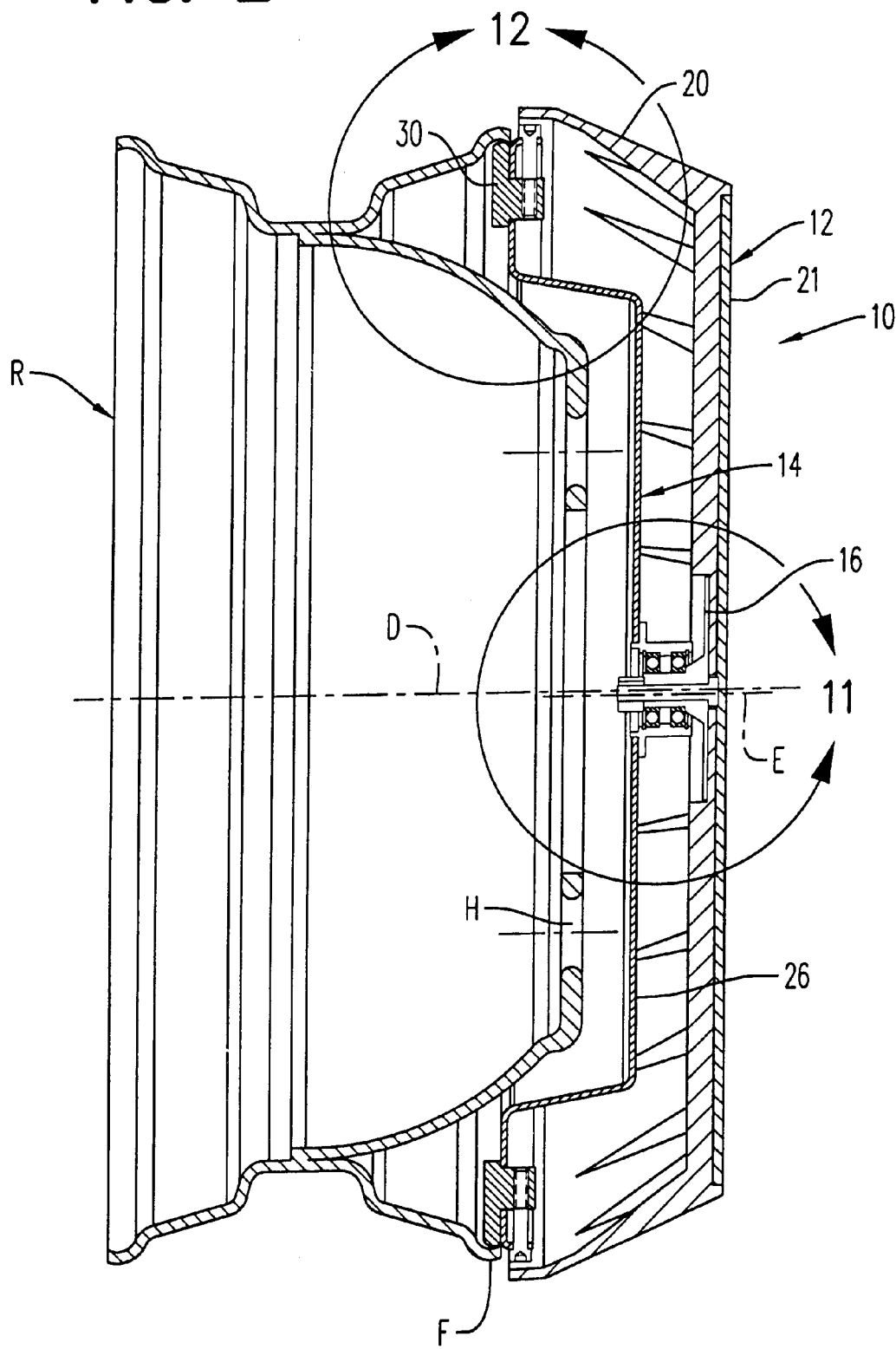
FIG. 2 is a section view in the direction of arrows 2—2 in FIG. 1.
Figure 3:
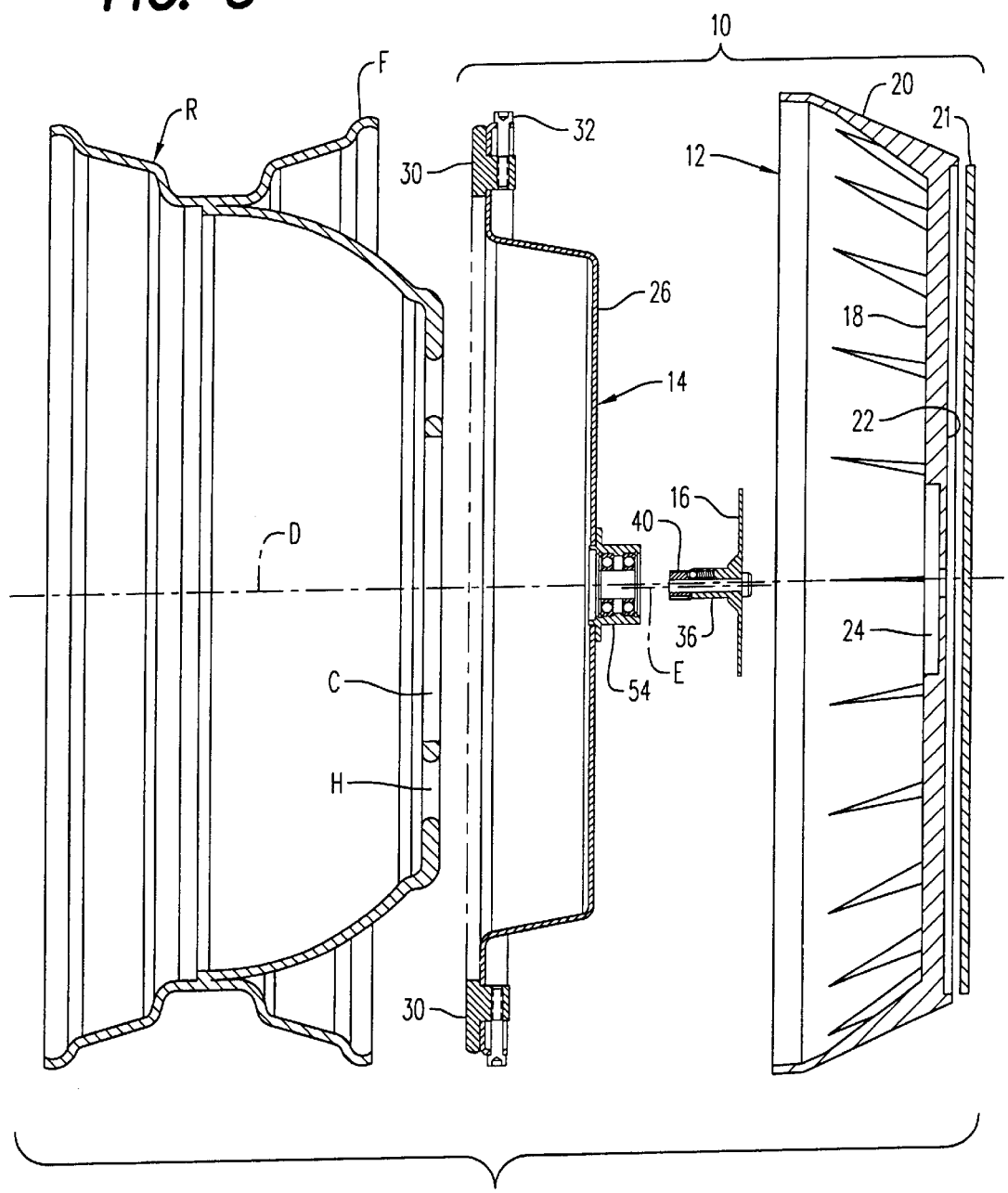
FIG. 3 is an exploded view of FIG. 2.

Referring now to the drawings, the preferred embodiment of the invention is shown in FIGS. 1A, 1, 2 and 3 generally at numeral 10. The invention 10 is attachable to a wheel W of a preferably commercial vehicle V, the wheel W having a conventional inflatable pneumatic tire T for supporting the vehicle. The wheel cover 10 includes an outer wheel cover 12 having a replaceable disc-shaped display member 20 attached to the outer surface thereof. This display member 20 may bear any form of commercial advertising indicia as desired and may be replaced with another display member having a different commercial message at appropriate times. Facilitated by the present invention 10, then, the readable indicia on each display member 20 is maintained in a stationary orientation with respect to the vehicle V even while it is in motion.

Figure 4:
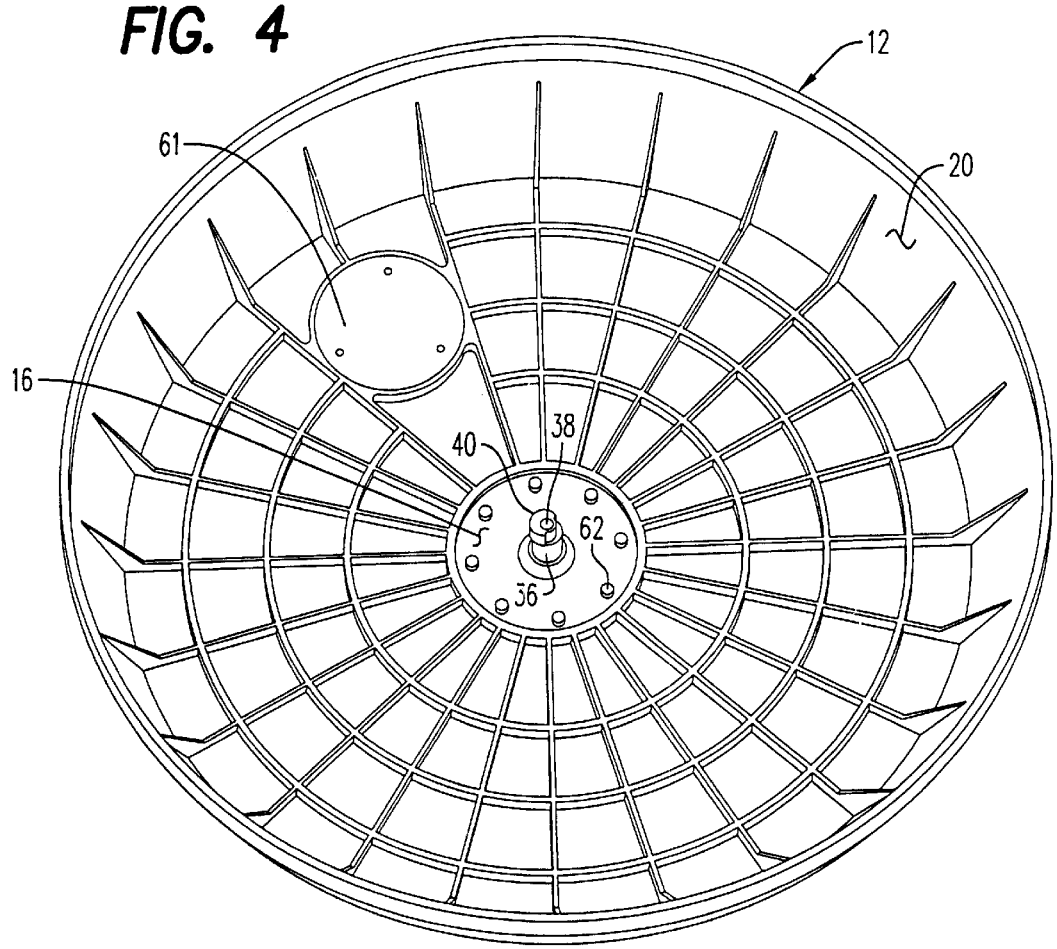
FIG. 4 is a perspective view of the inside surface of the wheel cover of the present invention
Figure 5:
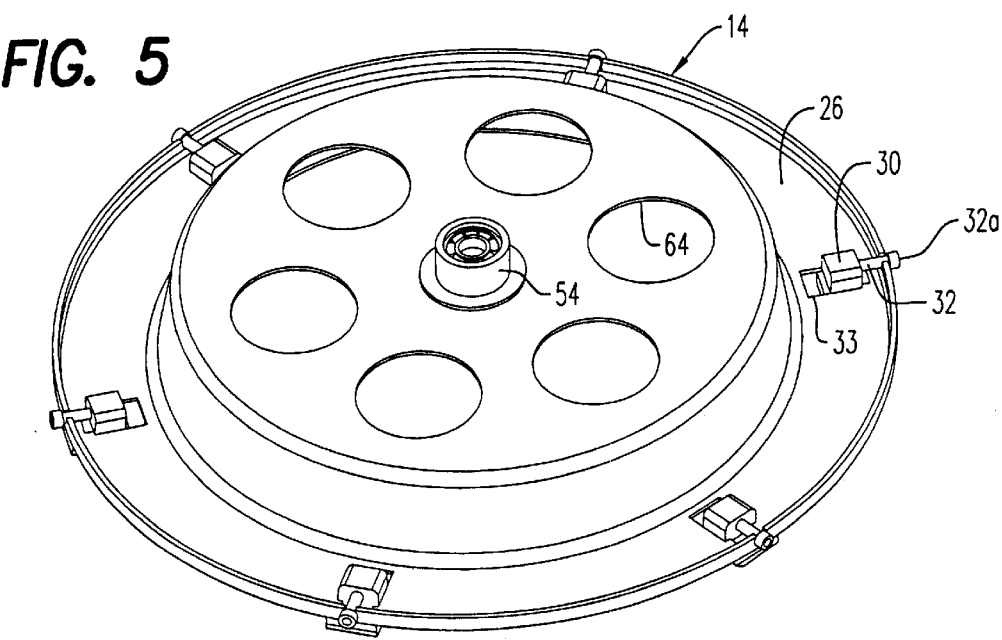
FIG. 5 is an outside perspective view of the preferred embodiment of the inner cover of the invention as shown in FIGS. 1 to 3.
Figure 6:
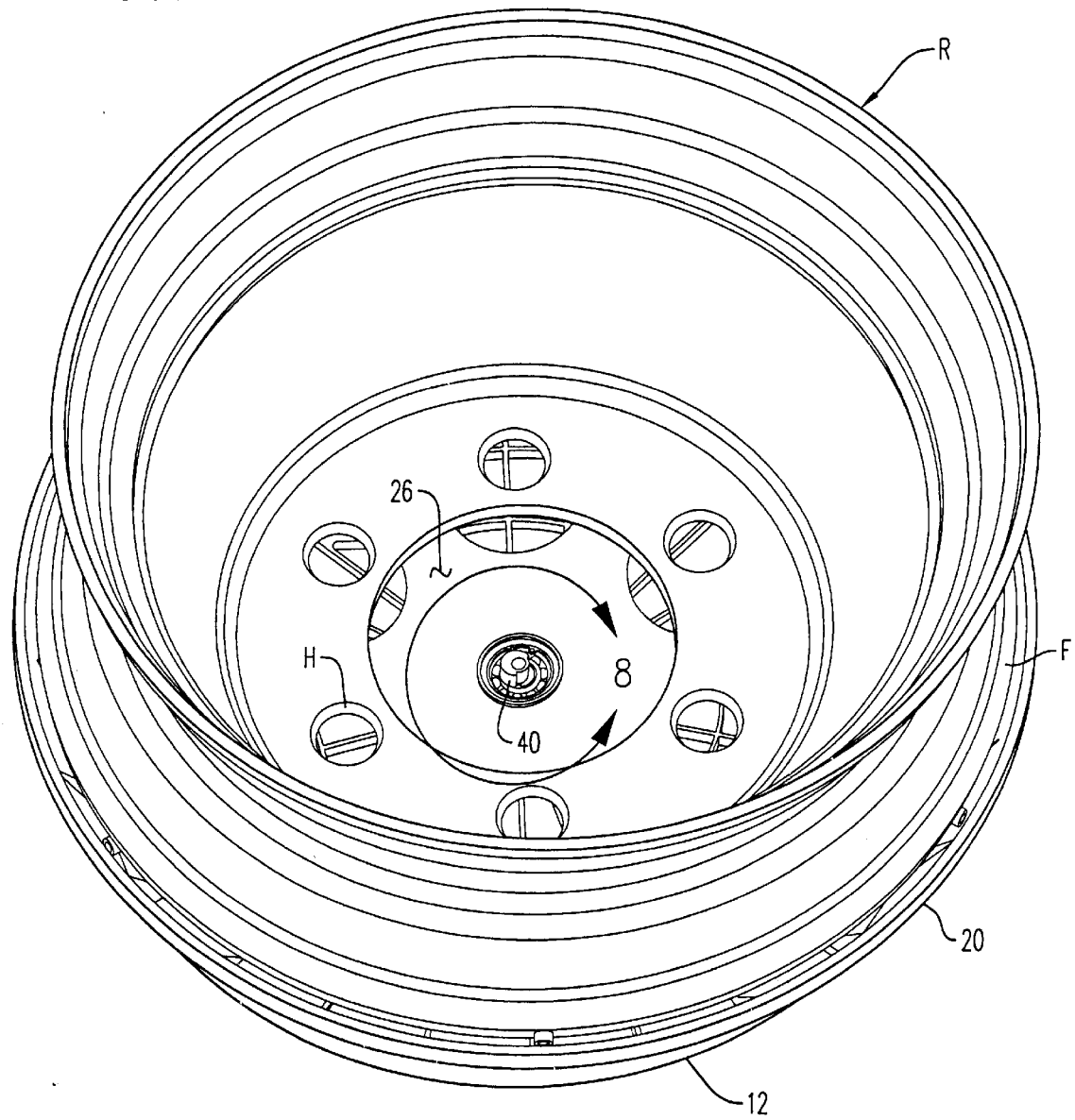
FIG. 6 is an inside perspective view of the invention as shown in FIG. 1.

Referring also to FIGS. 4 to 6, the device 10 also includes an inner member shown generally at numeral 14 convertible for relative rotation only to the circular wheel cover 12. The inner member 14 is generally hat-shaped having an enlarged flat or planar central portion 26 which is circular about a centerline D which is coaxial with the center line of the rim R of the wheel W. The circular wheel cover 12 generally has an elongated for flattened U-shape cross sectional configuration, the circular, flat outside surface of which forms a cavity 22 for receiving the generally flat circular display or advertising disc 21 attached thereto by conventional means (not shown). The outer periphery 20 of the wheel cover 12 extends outwardly and inwardly from the generally flat central portion 18 so as to protectively surround the outer periphery of the inner member 14 and the rim engaging members 30 movably attached thereto as described herebelow.

Figure 12:
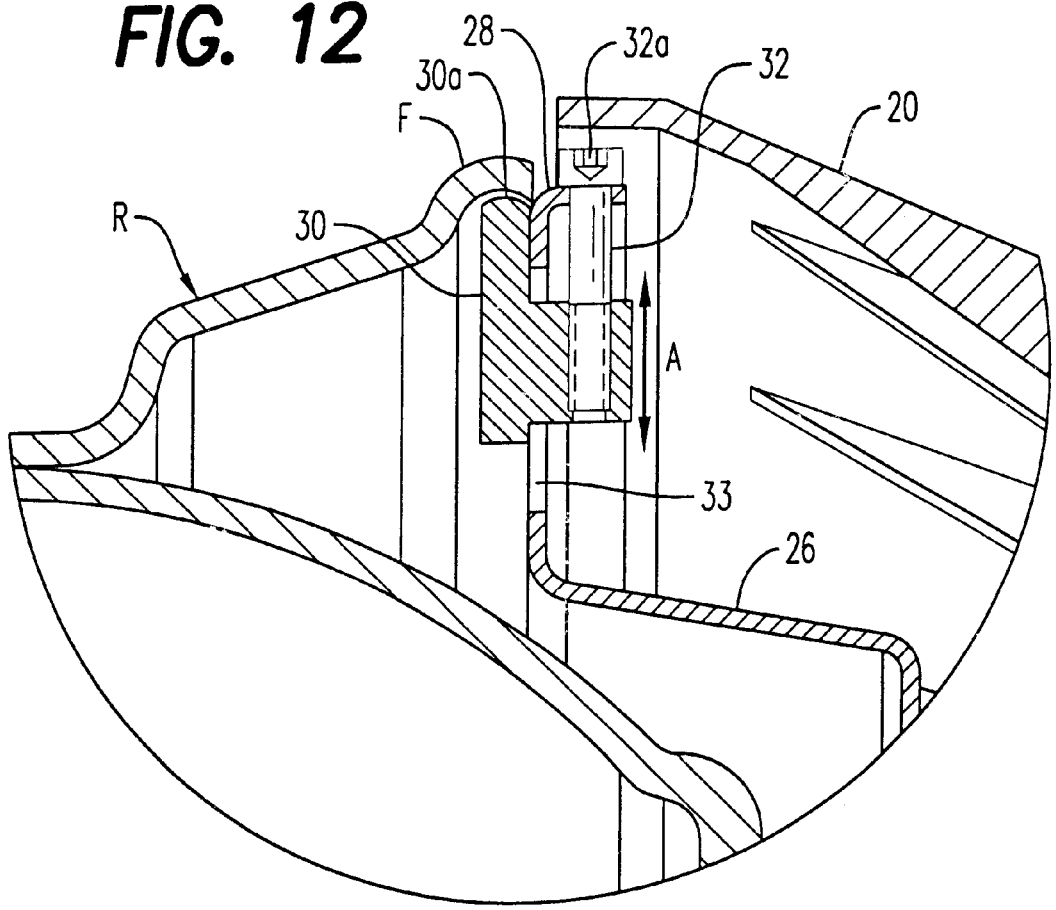
FIG. 12 is an enlargement of area 12 in FIG. 2.

As best seen in additional FIGS. 5 and 12, a plurality of evenly spaced wheel rim engaging members 30 are mounted in mating slots 33 formed into the planar annular shaped outer periphery 26 of the inner member 14. Each of the rim engaging members 30 also includes a threaded aperture extending radially through one thinner section thereof as best seen in FIG. 12 which is engaged by an elongated threaded fastener 32 which, in turn, is held within the outer flange 28 of the inner member 14.

By proper rotation of the threaded fastener 32 using a key fitted into the socket 32a, radial movement in the direction of arrow A of each rim engaging member 30 is independently accomplished so that the convex distal margin 30a matably engages into the concaved periphery F of rim R. By this arrangement, the evenly-spaced rim engaging members 30 are lockably engageable into the concave portion F of the rim so as to properly secure and center the inner member 12 with respect to the rim R and its rotational axis D.

Figure 11:
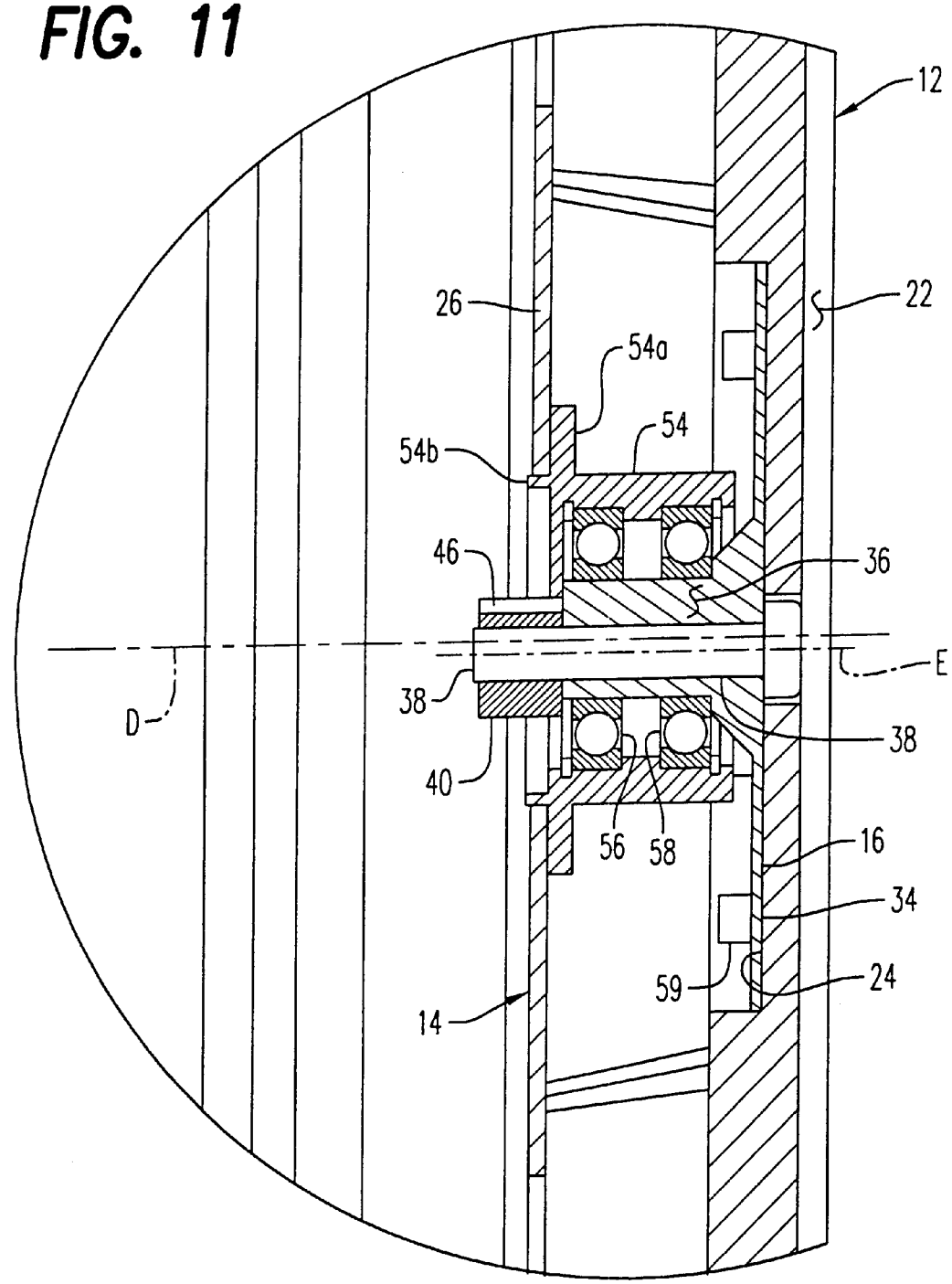
FIG. 11 is an enlargement of area 11 of FIG. 2.

As best seen in FIG. 11, the inner member 14 further includes a support bearing member 54 which is rigidly connected to the planar central portion 26 by its annular flange 54b and radial flange 54a. Included within the support bearing member 54 are two spaced roller bearings 56 and 58 which supportively receive a support shaft 36 having an enlarged mounting flange 16 which is rigidly attached to the central inner surface of the wheel cover 12 within a mating cavity 24 by threaded evenly spaced threaded fasteners 59. The outer cylindrical surface of the support shaft 36 is closely aligned for snug or close sliding fit within the inside diameter of the support bearings 56 and 58. By this arrangement, the support shaft with the display cover 12 rigidly connected thereto and outwardly positioned therefrom, is slidably engageable into the bearings 56 and 58 of the support bearing member 54. Clearance holes 64 provide access to wheel lug nuts which attach the wheel W to the axle (not shown)

The locking and anti-theft features of the invention are best seen in FIGS. 7 to 11. An elongated cylindrical locking member is there shown at numeral 38 including an elongated cylindrical shaft and an enlarged headed portion having a unique drive slot 55 formed therein. The locking member 38 snugly and slidably engages within an elongated aperture formed longitudinally through the support shaft 36. Note importantly that the axis E of the elongated locking member 38 is offset from the longitudinal axis D which is concentric with the outer cylindrical surface of the support member 36, the wheel W and the inner member 14.

Figure 7:
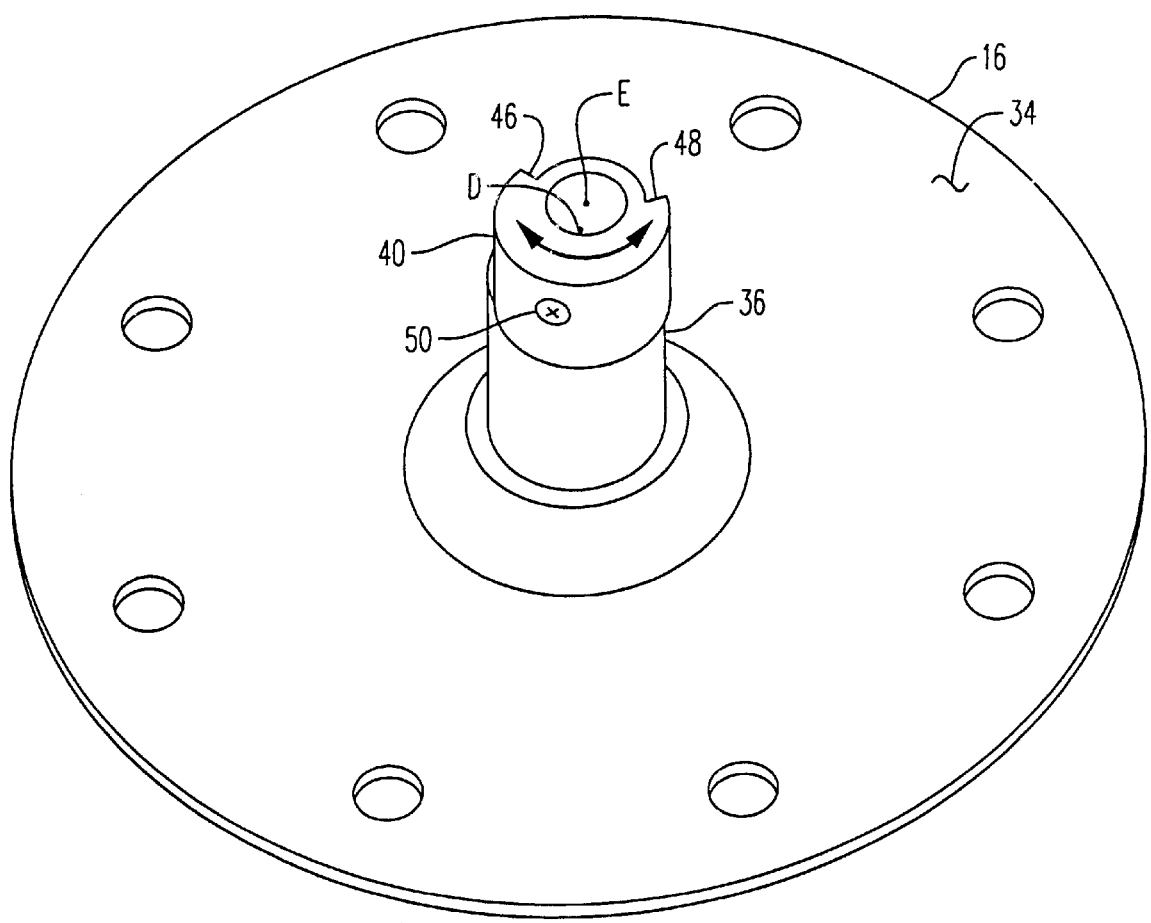
FIG. 7 is an inside perspective view of the support shaft and locking mechanism which is mechanically attached to the inner surface of the wheel cover as shown in FIGS. 1 to 3.
Figure 8:
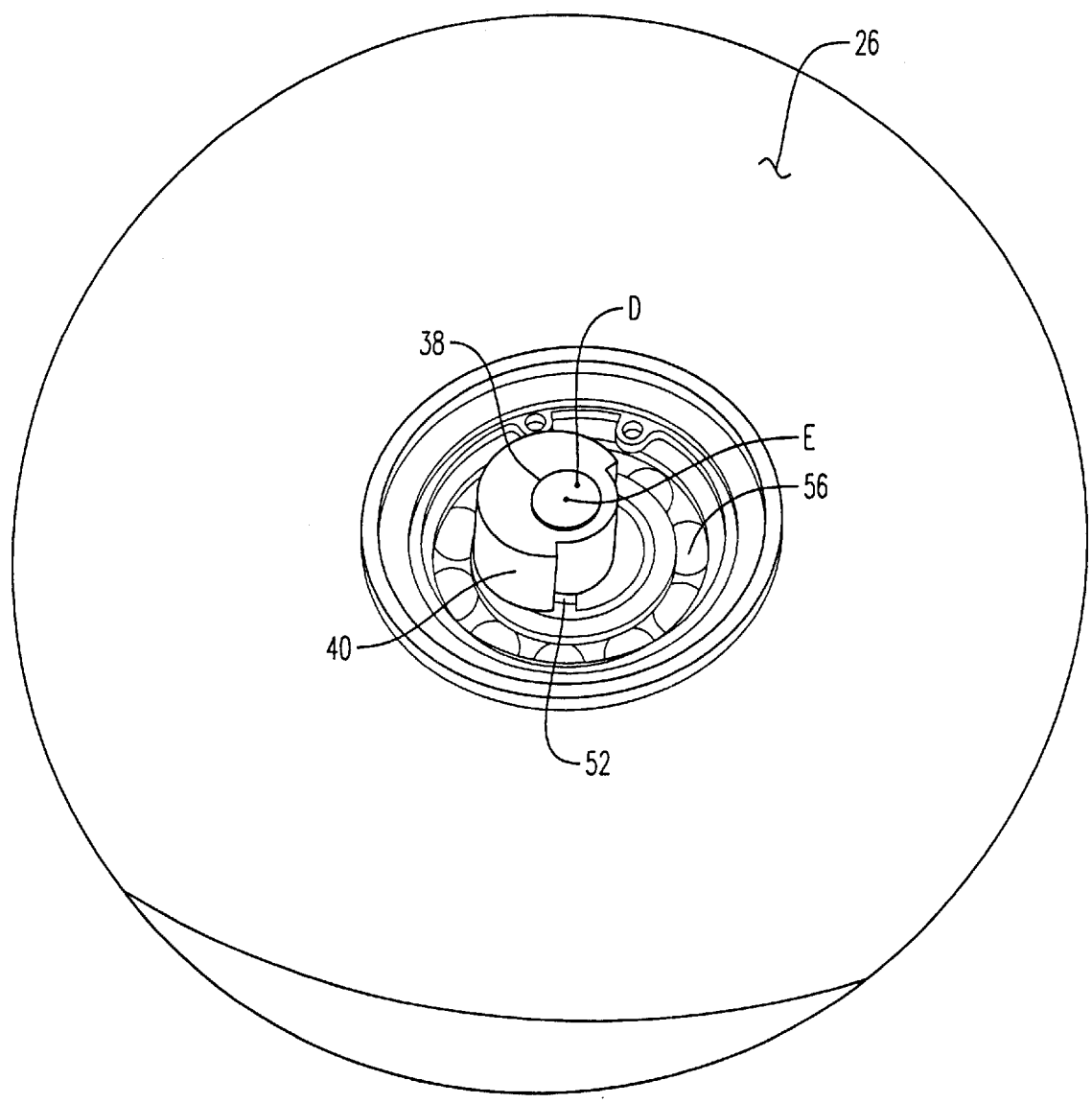
FIG. 8 is an enlarged view of area 8 in FIG. 6.
Figures 9, 10:
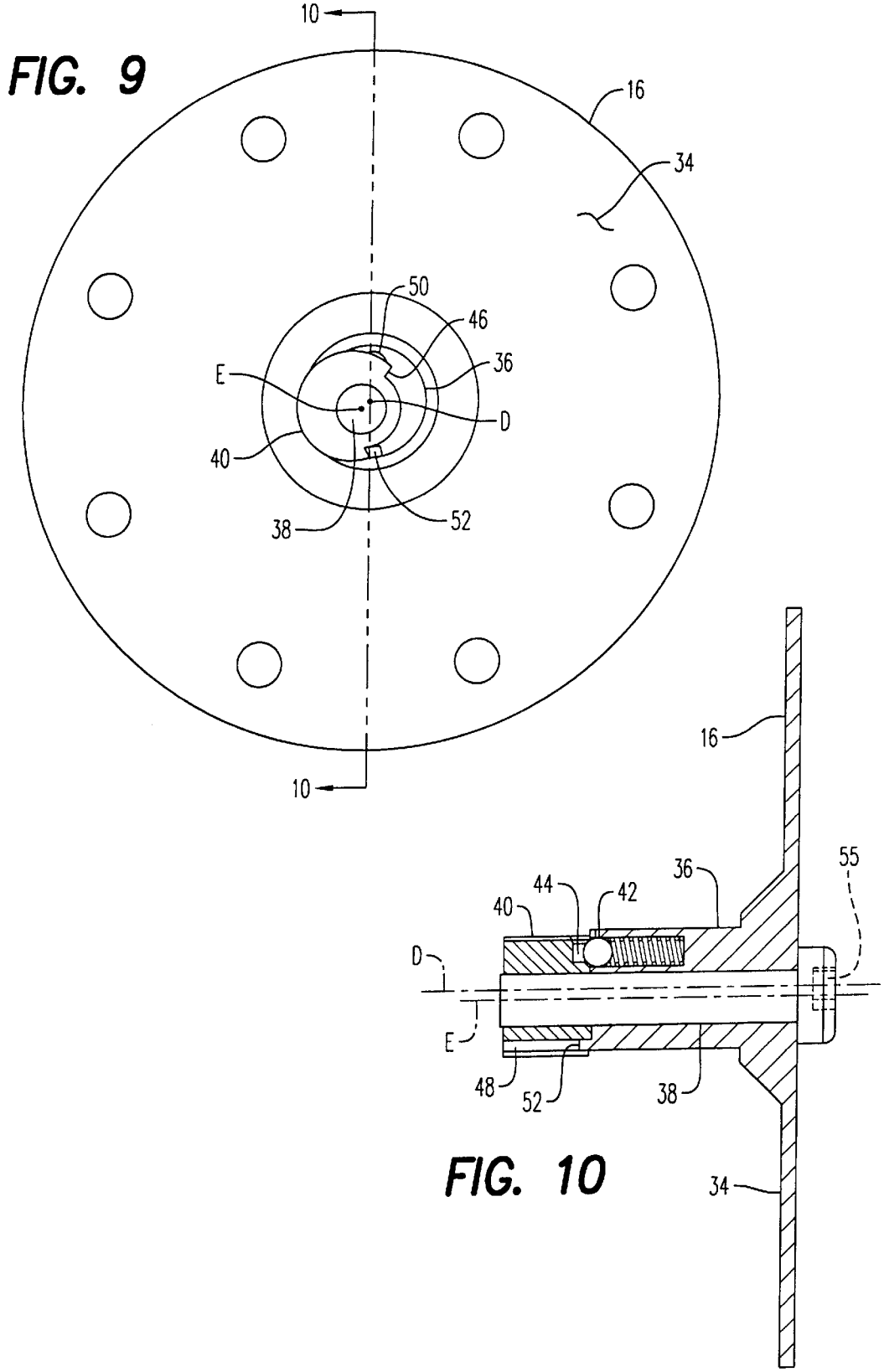
FIG. 9 is an inside elevation view of FIG. 7.
FIG. 10 is a section view in the direction of arrows 10—10 in FIG. 9.

A cam member 40 is mechanically attached by a set screw 50 to the distal end of the locking member 38. A detent ball 42 and spring as seen in FIG. 10 form a detent which snapably engage into a cavity 44 formed in the inner face of the cam 40 which mates against the distal end surface of the support shaft 36. A tab 52, which extends inwardly from the distal surface of the support shaft 36, engages against a notched surface 46 or 48 of the cam member 40 to limit the rotation in the direction of the arrow about axis E as best seen in FIG. 7.

By this arrangement, the cam member 40 may be moved into a rotational orientation as shown in FIG. 10 so that it is in substantially cylindrical alignment within the cylindrical projected envelope defined by the support shaft 36 allowing insertion of the support shaft 36 into the support bearing member 54 as best shown in FIG. 11. Thereafter, the locking member 38 may be rotated to another orientation of the cam member 40 by the insertion of a uniquely configured turning member or key (not shown) into cavity 55 wherein the cam member 40 rotating about offset axis E, causes an interference against the distal end of the support shaft 36 preventing removal of the wheel cover 12 as best seen in FIGS. 7, 8, 9 and 11.

Figure 13:
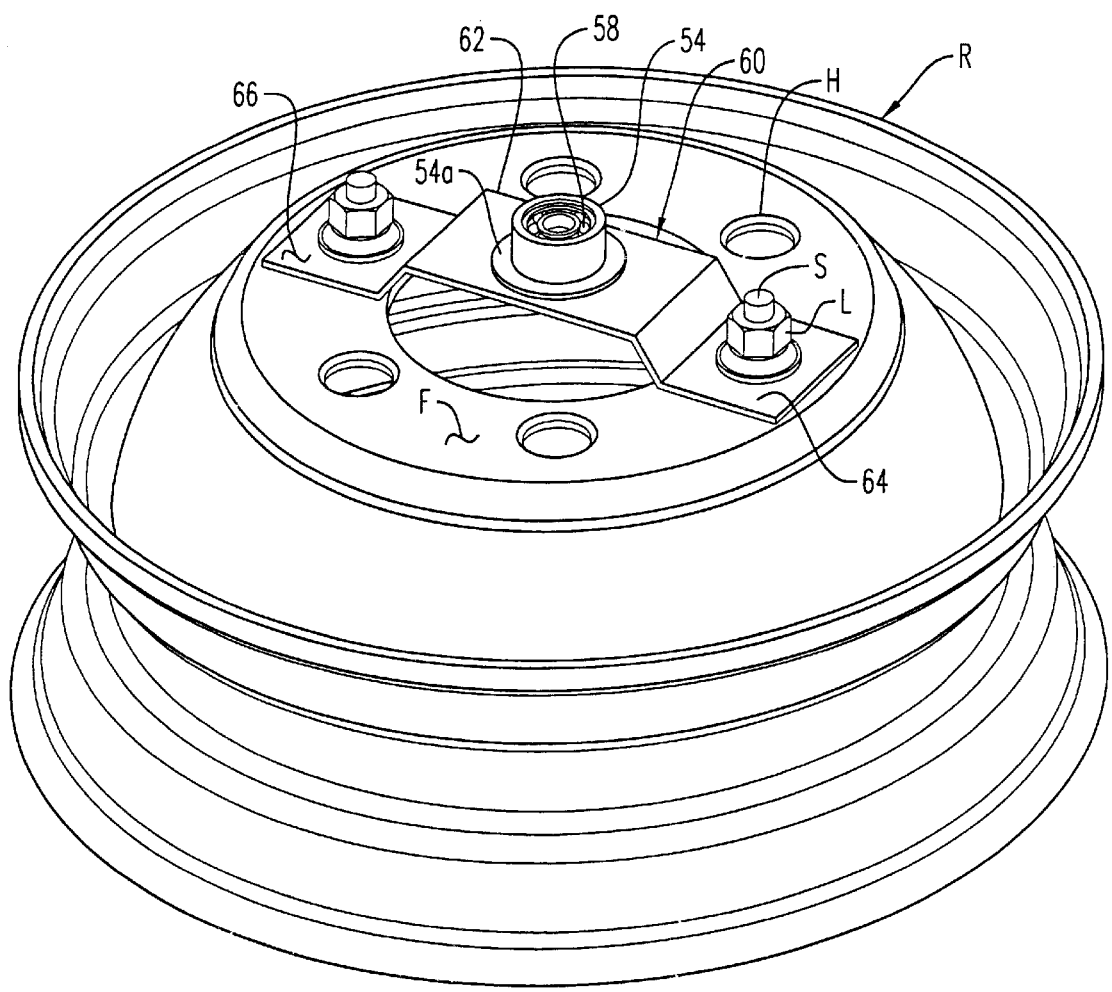
FIG. 13 is an outside perspective view of another embodiment of an inner member adapted for attachment to the mounting lugs of the wheel of the vehicle.

By this arrangement of providing a uniquely configured cavity 55 or a key slot arrangement, the locking member 38 may only be rotated into the unlocked position of cam member 40 shown in FIG. 10 for removal of the wheel cover 12 by the holder of such a turning member or key Referring lastly to FIG. 13, an alternate embodiment of the inner member is there shown generally at numeral 60. In this embodiment 60, an elongated flat offset bracket includes a central portion 62 which is outwardly offset along the rotational axis D of the rim R from flat outer mounting surfaces 64 and 66. These outer mounting surfaces 64 and 66 include apertures which matably align with oppositely positioned studs which align the rim R onto the drive axle of the vehicle (not shown) and which thereafter are threadably engaged by lugs L. This embodiment 60 includes the same bearing support member 54 with its support flange 54a and support bearings 58 as previously described.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A non-rotating display wheel cover assembly connectable to a rotatable wheel of a vehicle comprising:

an inner member rigidly connectable to the outside of the wheel and having a support bearing member centrally positioned on said inner member in substantially coaxial alignment with a rotational axis of the wheel;

a circular wheel cover having a support shaft extending concentrically and orthogonally from an inside surface of said wheel cover, said support shaft supported for rotation in coaxial alignment when fully engaged with said support bearing member;

an elongated cylindrical locking member having a distal end and an enlarged proximal end and rotatably positioned within, and coextensive with, a longitudinal aperture formed through said support shaft;

a cam member connected to a distal end of, and rotatable with, said locking member, said cam member having a non-symmetric periphery with respect to a rotational axis of said locking member and having a first rotational orientation with respect to said support shaft wherein said support shaft and said locking member are fully insertable as a unit into said support bearing member to effect full attachment between said inner member and said wheel cover and a second rotational orientation wherein, after said support shaft and said locking member are fully inserted into said support bearing, said cam member prevents withdrawal of said support shaft from said support bearing member, thus locking said inner member and said wheel cover together for relative rotation only therebetween;

a counterweight attached to said wheel cover to substantially prevent rotation of said wheel cover with respect to the vehicle as the wheel is rotated during vehicle movement;

an interchangeable display indicia attached to an outer surface of said wheel cover which remains substantially upright and readable during vehicle movement.

2. A non-rotating display wheel cover assembly connectable to a rotatable wheel of a vehicle comprising:

an inner member having a central portion offset outwardly from a plane defining an outer annual peripheral portion of said inner members, said inner member rigidly connectable to the outside of the wheel and having a support bearing member centrally positioned on and orthogonal inwardly extending from said central portion of said inner member in substantially coaxial alignment with a rotational axis of the wheel;

a circular wheel cover having a central portion from which a support shaft extends concentrically and orthogonally from an inside surface of the central portion of said wheel cover, said support shaft supported for rotation in coaxial alignment with said support bearing member when fully engaged therewith;

said support shaft having a longitudinal aperture formed therethrough having a central axis displayed from and parallel to a central axis of said support shaft;

an elongated cylindrical locking member having a distal end and an enlarged proximal end and rotatably positioned within, and generally coextensive with said aperture;

a cam member connected to a distal end of, and rotatable with, said locking member, said cam member having a non-symmetric periphery with respect to a rotational axis of said locking member and having a first rotational orientation with respect to said support shaft wherein said support shaft and said locking member are fully insertable as a unit into said support bearing member to effect full attachment between said inner member and said wheel cover and a second rotational orientation wherein, after said support shaft and said locking member are fully inserted into said support bearing, said cam member prevents withdrawal of said support shaft from said support bearing member, thus locking said inner member and said wheel cover together for relative rotation only therebetween;

a counterweight attached to said wheel cover to substantially prevent rotation of said wheel cover with respect to the vehicle as the wheel is rotated during vehicle movement;

an interchangeable display indicia attached to an outer surface of said wheel cover which remains substantially upright and readable during vehicle movement.

3. A non-rotating display wheel cover assembly connectable to a rotatable wheel of a vehicle comprising:

an inner member having a planar central portion and a planar outer portion offset inwardly from said central portion, said inner member rigidly connectable to the outside of the wheel and having a support bearing member centrally positioned on said inner member in substantially coaxial alignment with a rotational axis of the wheel;

a plurality of spaced wheel rim engaging members movably connected to the outer portion of said inner member, each of which is independently adjustable in radial position for tight engagement into a wheel rim of the wheel whereby all of said plurality of wheel-engaging members are uniformly retentively engaged into the wheel rim;

a circular wheel cover including a central portion from which a support shaft extends concentrically and orthogonally from an inside surface of said wheel cover, said support shaft supported for rotation in coaxial alignment when fully engaged within said support bearing member, said wheel cover also having an inwardly extending periphery positioned in close proximity to said wheel rim engaging members;

said support shaft having a cylindrical outer surface and a longitudinal cylindrical aperture formed therethrough, the longitudinal axes of said support shaft and said aperture being parallel and spaced apart;

an elongated cylindrical locking member having an enlarged proximal end and rotatably positioned in close mating alignment within, and coextensive with, said aperture;

said locking member including a cam member attached to and defining a distal end of said locking member, said cam member having a non-symmetric periphery with respect to that of said locking member and said support shaft and having a first rotational orientation with respect to said support shaft wherein said support shaft and said locking member are fully insertable as a unit into said support bearing member to effect full attachment between said inner member and said wheel cover and a second rotational orientation wherein, after said support shaft with said locking member positioned within said aperture, are fully inserted into said support bearing, said cam member prevents withdrawal of said support shaft from said support bearing member, thus locking said inner member and said wheel cover together for relative rotation only therebetween;

a counterweight attached to said wheel cover to substantially prevent rotation of said wheel cover with respect to the vehicle as the wheel is rotated during vehicle movement;

an interchangeable display indicia attached to an outer surface of said wheel cover which remains substantially upright and readable during vehicle movement.

* * * * *